United States Patent [19]

Sekmakas et al.

[11] Patent Number: 4,497,946
[45] Date of Patent: Feb. 5, 1985

[54] EPOXY PHOSPHATE-CARBOXYL COPOLYMERS AND AQUEOUS COATINGS CONTAINING THE SAME

[75] Inventors: Kazys Sekmakas, Palatine; Raj Shah, Schaumburg, both of Ill.

[73] Assignee: DeSoto, Inc., Des Plaines, Ill.

[21] Appl. No.: 484,509

[22] Filed: Apr. 13, 1983

[51] Int. Cl.$^3$ .................. C08G 59/00; C08G 65/28
[52] U.S. Cl. ...................................... 528/99; 528/108; 528/365; 525/488; 525/514; 523/423
[58] Field of Search .................. 528/108, 99, 365; 525/488, 514; 523/423

[56] References Cited

U.S. PATENT DOCUMENTS

| | | | |
|---|---|---|---|
| 2,541,027 | 5/1948 | Bradley | 528/108 |
| 2,732,367 | 1/1956 | Shokal | 528/108 |
| 3,378,601 | 4/1968 | Tanaka et al. | 528/488 |
| 4,301,261 | 11/1981 | Jackson | 528/108 |
| 4,360,613 | 11/1982 | Shimp | 528/108 |

Primary Examiner—John Kight
Assistant Examiner—Garnette D. Draper
Attorney, Agent, or Firm—Dressler, Goldsmith, Shore, Sutker & Milnamow, Ltd.

[57] ABSTRACT

Epoxy phosphate-carboxyl copolymers substantially free of epoxy functionality and aqueous coatings containing the same are disclosed. These copolymers are formed by copolymerizing monoethylenically unsaturated monomers, including carboxyl-functional monomer, in an organic solvent solution containing an epoxy-functional epoxy phosphate, there being at least 5% of carboxyl-functional monomer and at least 10% of total monomers present in the copolymer. The copolymer is converted into a water soluble salt with volatile amine and phenoplast resins are preferably used to provide at least part of the curing agent.

14 Claims, No Drawings

EPOXY PHOSPHATE-CARBOXYL COPOLYMERS AND AQUEOUS COATINGS CONTAINING THE SAME

DESCRIPTION

1. Field of Invention

This invention relates to aqueous coatings containing epoxy phosphates possessing improved stability in aqueous medium, especially in combination with phenoplast resins.

2. Background Art

Aqueous coatings containing epoxy phosphates are known. While these contribute good coating properties when cured with aminoplast or phenoplast curing agents, they have been difficult to use effectively because the aqueous dispersions containing these epoxy phosphates have lacked stability. In some instances the aqueous dispersions settle out and become useless. In other instances, the coating properties change with time, rendering the coatings unreliable and unpredictable. Application problems, such as the presence of large particles which damage the final films, frequently characterize the difficulties which are encountered. This stability problem has been particularly evident when phenoplast curing agents are used in an effort to provide coatings possessing superior corrosion resistance, as is desired in coatings for sanitary can use.

DISCLOSURE OF INVENTION

In this invention, an epoxy-functional epoxy phosphate is copolymerized in organic solvent solution with monoethylenically unsaturated monomers, including at least about 5% of a carboxyl-functional monomer and at least about 10% of total monomers (based on the copolymer) to provide a copolymer having carboxyl functionality and which is dispersible in water with the aid of an amine to provide a dispersion of uniformly fine particle size which is stable, even in the presence of large amounts of phenoplast curing agent.

During the copolymerization reaction substantially all of the epoxy functionality is consumed by esterification with the carboxyl-functional monomer and the product is carboxyl-functional so that it can be dispersed in water by salt formation with an amine. The volatile amines used for this purpose are common knowledge and are illustrated in the examples.

The epoxy phosphate is conveniently formed by reacting a resinous polyepoxide with ortho phosphoric acid (pyrophosphoric acid is regarded to be an equivalent because it generates ortho phosphoric acid) in an organic solvent solution. Only one of the phosphoric acid OH groups appears to react, and based on such stoichiometry, excess 1,2-oxirane functionality is present in the polyepoxide to provide an epoxy-functional epoxy phosphate. The organic solvent is preferably water miscible, alcoholic solvents like 2-ethoxy ethanol and 2-butoxy ethanol being preferred.

Monoethylenically unsaturated monomers, including carboxyl-functional monomers, are then dissolved therein, and these monomers are then copolymerized in the presence of a free radical-generating catalyst to provide a copolymer in which the epoxy phosphate is part of the copolymer molecule. While some grafting may occur, the primary mechanism for combining the addition polymeric structure with the epoxy phosphate is believed to involve esterification of the epoxy groups in the epoxy phosphate by the carboxy groups in the carboxyl-functional monomer. At least about 5% of carboxyl-functional monomer, based on the weight of the copolymer, is employed to consume epoxy functionality and to provide excess carboxyl functionality for water dispersibility with the aid of a volatile amine which forms salt groups therewith. The unreacted acidity of the orthophosphoric acid also forms salt groups with the volatile amine and this aids water dispersibility. Some water miscible solvent is also present, and this further assists dispersibility in water.

The carboxyl-functional monomers which are copolymerizable and which form salts to aid water dispersibility are well known and are preferably constituted by acrylic and methacrylic acids. The proportion of total monomer in the copolymer is preferably from 10% to 200% of the weight of the epoxy phosphate, most preferably not in excess of 100%, and the carboxy-functional monomer is preferably used in an amount of from 10% to 35% of the epoxy ester. The copolymer acid value is desirably 30–120, most preferably 50–90.

Throughout this specification and claims, all proportions are by weight, unless otherwise specified.

Any organic solvent-soluble resinous polyepoxide may be used herein. By a polyepoxide is meant a 1,2-epoxy equivalency of at least about 1.2. Diepoxides are preferred, especially diglycidyl ethers of bisphenols having a 1,2-epoxy equivalency in the range of 1.3–2.0. The class of bisphenols is well known, and bisphenol A is usually used in commerce. Diglycidyl ethers of bisphenol A are commonly available in commerce and the commercial materials are fully useful herein. It is preferred to employ those having an average molecular weight (by calculation) of from about 500, more preferably at least about 1000, up to about 5000. Epon 1007 from Shell Chemical Company will be used as illustrative. Epon 1004 and Epon 1001 are also useful herein and will further illustrate preferred polyepoxides.

The proportion of phosphoric acid is not critical herein so long as epoxy functionality is left to permit the carboxyl-functional monomer to couple with the polyepoxide by esterification which takes place in the presence of the phosphate groups (an esterification catalyst may be added if desired). It is appropriate to use the phsophoric acid in an amount such that the epoxy ester contains from 0.05 mol to 1.0 mol of phosphoric acid per epoxide equivalent in the polyepoxide, which is preferably a diglycidyl either as noted above. It is preferred to employ from 0.1 to 0.3 mol of ortho phosphoric acid per epoxide equivalent in the polyepoxide.

It is desired to point out that it is preferred to minimize the proportion of phosphoric acid in order to provide the best resistance to chemical attack in the final cured coatings. Of course, enough phosphoric acid must be used to provide the desired curing catalysis. This means that the epoxy phosphate which is formed will include unreacted epoxy groups. It is believed that only about one P—OH group reacts in the ortho phosphoric acid, so some P—OH groups remain in the epoxy phosphate. It is these unreacted epoxy groups which led to instability in the prior art aqueous dispersions which were formed, especially when phenoplast curing agents were used. In this invention, it appears that the copolymerization reaction with carboxyl-functional monomer forces the consumption of the unreacted epoxy groups and it also enhances dispersibility in water with the aid of an amine so that nonwater soluble curing agents are more stably suspended in the aqueous coating compositions which are formed.

While some grafting is thought to occur, it is thought that graft coupling is very limited and that esterification is the prime coupling mechanism.

Catalysis of the copolymerization reaction is conventional, and will be illustrated herein using cumene hydroperoxide. A copolymerizatin temperature over 100° C. is preferred to force consumption of the unreacted epoxy groups, and a temperature of 125° C. will be used as illustrative.

Mercaptan chain terminators are desirably avoided when sanitary can use is intended. The alcoholic solvents which are preferred likely have some limited chain terminating function. 2-butoxy ethanol is the preferred solvent and will be used in the Example.

The other monomers which may be copolymerized with the epoxy phosphates in accordance with this invention are those commonly used in the production of film-forming addition copolymers from monoethylenically unsaturated monomers. These are illustrated by styrene, vinyl toluene, vinyl acetate and acrylate and methacrylate esters, like methyl methacrylate, methyl acrylate, ethyl acrylate and n-butyl and isobutyl acrylate and methacrylate.

The copolymers of this invention are cured with curing agents, especially aminoplast and/or phenoplast resins. These may be added either to the copolymer solution or to the aqueous dispersion containing the dispersed copolymer to provide a stable and curable aqueous thermosetting coating composition. When the curing agent is added to the copolymer solution, it is preferred to heat the mixture in order to heat-compatilize the mixture. This better enables the copolymer to colloidally disperse the curing agent in the aqueous dispersion. This is particularly advantageous when some of the preferred curing agents which are not water soluble are employed. The preferred curing agents are phenoplast resins which are not soluble in water directly. These provide greater resistance to chemical attack and may be used as the sole curing agent, or together with aminoplast resins.

It is desired to point out that these nonwater-soluble phenoplast resin curing agents were previously characterized by poor stability in aqueous medium, but good stability is provided herein.

Water dispersible aminoplast resins and phenoplast resins are themselves well known and are boardly useful herein. These are illustrated by hexamethoxymethyl melamine and A-stage phenol-formaldehyde resols. The water insoluble curing agents which may be used are heat-hardening formaldehyde condensates which are dispersed in the water medium by the copolymer salt. Heat-hardening products employ at least about 1 mol of formaldehyde per mol of the phenol. Polymethylol phenols produced by the reaction with formaldehyde in alkaline medium may be used, but it is preferred to employ a cresol-formaldehyde reaction product containing about 1 mol of formaldehyde per mol of cresol. Ortho cresol is used in the cresol-formaldehyde resin available in commerce. These cresol-formaldehyde resins are preferably used in conjunction with aminoplast resins of higher functionality, like hexamethoxymethyl melamine. These mixtures cure to provide outstanding properties.

The curing agent should be used in an amount of from 5% to 50% of total nonvolatile resin solids, and up to about 30% of total nonvolatile resin solids is phenoplast resin.

The amines used for salt formation to provide dispersibility in water are well known, and may even be constituted by ammonia which is regarded to be an amine in this art. Dimethyl ethanol amine is well known to solubilize carboxyl-functional resins and will be used herein as illustrative.

The coatings herein can be applied in any desired fashion and are cured by baking. This removes volatile components, such as water, organic solvent, and the volatile amine which provides the salt groups in the copolymer. The epoxy phosphate component of the copolymer serves as the catalyst for the cure, but extraneous catalysts, like p-toluene sulphonic acid may be used, though this is not desirable since it impairs water resistance.

EXAMPLE 600 grams of 2-butoxy ethanol are mixed with 24 grams of 85% ortho phosphoric acid in a reactor equipped with a reflux condenser and a trap to remove water of condensation. The mixture is then heated to 120° C. with agitation. 875 grams of the Shell product Epon 1007 are then added slowly to the reactor forming a hot melt, and the mixture is held for 2 hours at 125° C. A premix of 160 grams of styrene, 8 grams of ethyl acrylate and 135 grams of methacrylic acid with 38 grams of cumene hydroperoxide are then added to the epoxy phosphate formed by the previously described reaction. Addition of the premix is made over a 2½ hour period with the temperature at 125° C. After addition, the mixture is held at 125° C. for 1 hour to complete the polymerization. The acid value of the copolymer solids is 74.

Another premix is now made to include 10 grams of cumene hydroperoxide (to insure completion of polymerization) 130 grams of 2-butoxy ethanol, 260 grams of an ortho-cresol-formaldehyde heat-hardening resin and 230 grams of hexamethoxymethyl melamine. This premix is then added to the reactor and the contents held at 125° C. for 1 hour. Then the reaction is completed by adding 10 grams of cumene hydroperoxide and holding for 1 hour at 125° C.

155 grams of dimethyl ethanol amine are than added in admixture with 145 grams of deionized water to the cooled reaction product over a 15 mixture period, and then the product is thinned to desired solids content by the addition of deionized water (first by the addition of 2610 grams over 1 hour) and then by the addition of 950 grams. This provides a milky dispersion.

The mixture of phenoplast and aminoplast resin in this example can be replaced with 260 grams of an alkaline-condensed polymethylol phenol resin.

The dispersion of this example is coated upon a flat aluminum substrate and cured in a 425° F. oven for 30 seconds to provide a cured film having a thickness of 0.3 mil. The cured film resisted 100 double rubs with a methyl ethyl ketone-saturated cloth and was excellently flexible. As a result the cured coated aluminum substrate can withstand fabrication to produce a can end for a two-piece sanitary can intended for the packaging of beer.

What is claimed is:

1. An epoxy phosphate-carboxyl copolymer substantially free of epoxy functionality and formed by copolymerizing monoethylenically unsaturated monomers, including carboxyl-functional monomer, in an organic solvent solution containing an epoxy-functional epoxy phosphate, there being at least 5% of carboxyl-functional monomer and at least 10% of total monomer present in the copolymer.

2. An epoxy phosphate copolymer as recited in claim 1 in which said epoxy phosphate is an epoxy-functional ester of ortho phosphoric acid with a diglycidyl ether of a bisphenol having an average molecular weight of from 500 to 5000 and a 1,2-epoxy equivalency in the range of 1.3–2.0, said ester containing from 0.05 mol to 1.0 mol of phosphoric acid per epoxide equivalent in said diglycidyl ether.

3. An epoxy phosphate copolymer as recited in claim 2 in which said monomers are used in a total amount of up to 100% of the weight of the epoxy ester, and the copolymerization is carried out in water-miscible organic solvent.

4. An epoxy phosphate copolymer as recited in claim 2 in which ortho phosphoric acid is used in an amount of from 0.1 to 0.3 mol per epoxide equivalent and said diglycidyl ether is an ether of bisphenol A having an average molecular weight of at least 1000.

5. A water soluble amine salt of the epoxy phosphate copolymer recited in claim 1.

6. An aqueous dispersion of the water soluble amine salt of claim 5.

7. A water soluble amine salt of the epoxy phosphate copolymer recited in claim 4.

8. An aqueous dispersion of the water soluble amine salt of claim 7.

9. An aqueous dispersion as recited in claim 6 in which there is present from 5% to 50% of total nonvolatile resin solids of a curing agent selected from aminoplast resin and phenoplast resin.

10. An aqueous dispersion as recited in claim 8 in which there is present from 5% to 50% of total nonvolatile resin solids of a curing agent selected from aminoplast resin and phenoplast resin, and up to 30% of total nonvolatile resin solids is phenoplast resin.

11. An aqueous dispersion as recited in claim 10 in which said phenoplast resin is a water insoluble heat-hardening formaldehyde condensate dispersed in the water medium by said copolymer salt.

12. An aqueous dispersion as recited in claim 11 in which said phenoplast resin contains about equimolar proportions of cresol and formaldehyde.

13. An epoxy phosphate-carboxyl copolymer substantially free of epoxy functionality and formed by copolymerizing monoethylenically unsaturated monomers, including carboxyl-functional monomer, in water-miscible organic solvent solution containing an epoxy-functional epoxy phosphate in which a diglycidyl ether of a bisphenol having an average molecular weight of from 500 to 5000 and a 1,2-epoxy equivalency in the range of 1.3–2.0 is esterfied with from 0.1 to 0.3 mol of ortho phosphoric acid per epoxide equivalent in said diglycidyl ether, there being at least 5% of carboxyl-functional monomer and from 10% to 100% of total monomer present in the copolymer, based on the weight of the epoxy phosphate, to provide a copolymer acid number of from 30 to 120.

14. An epoxy phosphate copolymer as recited in claim 13 in which the copolymer acid number is from 50 to 90.

* * * * *